United States Patent
McCauley

(10) Patent No.: US 10,954,327 B2
(45) Date of Patent: Mar. 23, 2021

(54) METHODS TO PREPARE CATALYSTS FOR IN-LINE BULK POLYMERIZATION

(71) Applicant: Bridgestone Corporation, Chuo-ku (JP)

(72) Inventor: Kevin M. McCauley, Akron, OH (US)

(73) Assignee: Bridgestone Corporation, Chuo-ku (JP)

(*) Notice: Subject to any disclaimer, the term of this patent is extended or adjusted under 35 U.S.C. 154(b) by 0 days.

(21) Appl. No.: 16/345,845

(22) PCT Filed: Oct. 31, 2017

(86) PCT No.: PCT/US2017/059292
§ 371 (c)(1),
(2) Date: Apr. 29, 2019

(87) PCT Pub. No.: WO2018/081798
PCT Pub. Date: May 3, 2018

(65) Prior Publication Data
US 2019/0256627 A1    Aug. 22, 2019

Related U.S. Application Data

(60) Provisional application No. 62/414,841, filed on Oct. 31, 2016.

(51) Int. Cl.
| C08F 136/06 | (2006.01) |
| C08F 36/06 | (2006.01) |
| C08F 4/54 | (2006.01) |
| C08F 4/619 | (2006.01) |
| C08F 36/04 | (2006.01) |
| C08F 4/602 | (2006.01) |

(52) U.S. Cl.
CPC ............ *C08F 136/06* (2013.01); *C08F 4/602* (2013.01); *C08F 4/619* (2013.01); *C08F 36/04* (2013.01); *C08F 36/06* (2013.01); *C08F 2410/01* (2013.01)

(58) Field of Classification Search
CPC .......... C08F 136/06; C08F 2/02; C08F 36/04; C08F 36/06; C08F 4/545; C08F 4/602; C08F 4/619
See application file for complete search history.

(56) References Cited

U.S. PATENT DOCUMENTS

| 4,461,883 | A | 7/1984 | Takeuchi et al. |
| 5,428,119 | A | 6/1995 | Knauf et al. |
| 5,567,784 | A | 10/1996 | Wieder et al. |
| 5,659,101 | A | 8/1997 | Biagini et al. |
| 6,576,727 | B1 | 6/2003 | Dauben et al. |
| 6,723,677 | B1* | 4/2004 | Estrada .................. C08F 10/00 502/103 |
| 6,780,948 | B2 | 8/2004 | Rachita et al. |
| 7,022,783 | B2 | 4/2006 | Hsu et al. |
| 7,153,805 | B2 | 12/2006 | Hsu et al. |
| 7,199,201 | B2 | 4/2007 | Halasa et al. |
| 7,825,201 | B2 | 11/2010 | Luo et al. |
| 8,623,975 | B2 | 1/2014 | Luo et al. |
| 8,846,837 | B2 | 9/2014 | Kloppenburg et al. |
| 9,000,107 | B2* | 4/2015 | Qin ......................... C08F 36/04 526/147 |
| 2011/0184137 | A1 | 7/2011 | Qin et al. |
| 2012/0172553 | A1 | 7/2012 | Luo et al. |
| 2012/0196995 | A1 | 8/2012 | Qin et al. |
| 2014/0011963 | A1 | 1/2014 | McCauley et al. |
| 2015/0031845 | A1 | 1/2015 | McCauley et al. |
| 2019/0211120 | A1* | 7/2019 | Baldwin ............... B60C 1/0016 |

FOREIGN PATENT DOCUMENTS

| WO | 2016057985 A1 | 4/2016 |
| WO | 2016081300 A1 | 5/2016 |
| WO | 2016123319 A1 | 8/2016 |
| WO | 2016123370 A1 | 8/2016 |

OTHER PUBLICATIONS

Zhang, et al.; Polymerization of 1,3-Conjugated Dienes with Rare-Earth Metal Precursors; Struct Bond 2010, No. 137, pp. 49-108.

* cited by examiner

*Primary Examiner* — Catherine S Branch
(74) *Attorney, Agent, or Firm* — Meredith E. Hooker; J. Gregory Chrisman

(57) ABSTRACT

A method is described for the formation of an active catalyst system for use in the in-line bulk polymerization of polydienes. The method provides a homogeneous, active catalyst system which is capable of being transported to a polymerization reactor for use without causing blockages in piping, thereby saving time and production costs. The catalyst system is formed in-line in a continuous method to avoid prolonged storage periods of the catalyst that can otherwise lead to degradation and disposal of the aged catalyst system.

15 Claims, No Drawings

METHODS TO PREPARE CATALYSTS FOR IN-LINE BULK POLYMERIZATION

TECHNICAL FIELD

The present disclosure relates to a method of preparing a catalyst system for use in the in-line bulk polymerization of polydienes, such as polybutadiene. The method serves to promote smooth transport of the catalyst and prevent piping blockages through the production of a homogeneous, active catalyst system, thereby decreasing production delays and costs.

BACKGROUND

Polydienes may be produced through the process of bulk polymerization, also known as mass polymerization, wherein a conjugated diene monomer is polymerized in the absence or substantial absence of any solvent, and the monomer itself effectively acts as the diluent. Bulk polymerization has many advantages, one of which is that the absence or substantial absence of solvent equates to less contaminants, less reactants, and a simplified purification process. The solventless feature of bulk polymerization also provides environmental advantages in that emissions and waste water pollution are reduced. Thus, bulk polymerization is favorable because it can cut production time and costs.

Despite the attractive advantages, bulk polymerization reactions require careful monitoring. Bulk polymerizations are highly exothermic. Moreover, in the absence of solvent, the bulk polymerization mixture becomes very viscous and requires strong stirring equipment. These properties make temperature control troublesome. Without careful supervision, hot spots, which promote product degradation, gelation, and discoloration, may occur. In severe instances, exothermic reactions associated with bulk polymerization may lead to "run away" reactions.

In order to exploit the attractive advantages of bulk polymerization, improvements to the process are being continually developed. For example, catalysts have been used to facilitate economically favorable reaction speeds and to slow polymerization reaction enough to regulate heat and promote safety.

Many catalysts used in bulk polymerization are prepared in a single batch. Catalysts formed in this manner are usually unstable and degrade over time, which often results in a loss of activity and an increase in the costs and duration of polymer production, especially during unexpected shutdowns. Moreover, many catalysts prepared in a single batch are temporarily heterogeneous. Such heterogeneous mixtures can cause blockages in piping and prevent transport in in-line polymerization systems.

It is an objective of the present disclosure to alleviate or overcome one or more difficulties related to the prior art. It has been found that a step-wise catalyst synthesis process can beneficially modify the catalyst's phase, decrease the likelihood of blockages, and avoid degradation in the in-line bulk polymerization of polydienes.

SUMMARY

In a first aspect, there is a process for preparing a polydiene. This process includes: (a) introducing a solution comprising an aluminoxane and an organoaluminum compound, the organoaluminum compound not being an aluminoxane, with a lanthanide compound to form a lanthanide catalyst component; (b) aging the lanthanide catalyst component to form an aged lanthanide catalyst component, the aging of the lanthanide catalyst component comprising mixing; (c) combining the aged lanthanide catalyst component with a halogen source to form an active catalyst system; (d) aging the active catalyst system to form an aged active catalyst system, the aging of the active catalyst system comprising mixing; and (e) adding the aged active catalyst system to a polymerization vessel to polymerize conjugated diene monomer.

In an example of aspect 1, the step of aging the lanthanide catalyst component comprises passing the lanthanide catalyst component through a first in-line mixer.

In another example of aspect 1, the first in-line mixer is a static mixer.

In another example of aspect 1, the first in-line mixer is a dynamic mixer.

In another example of aspect 1, the lanthanide catalyst component has a residence time in the first in-line mixer in the range of 1 to 10 minutes.

In another example of aspect 1, the lanthanide catalyst component is mixed for less than 5 minutes prior to combining the aged lanthanide component with the halogen source.

In another example of aspect 1, the aged lanthanide catalyst component is a homogeneous solution.

In another example of aspect 1, the step of aging the active catalyst system comprises passing the active catalyst system through a second in-line mixer.

In another example of aspect 1, the second in-line mixer is a static mixer.

In another example of aspect 1, the second in-line mixer is a dynamic mixer.

In another example of aspect 1, the active catalyst system has a residence time in the second in-line mixer in the range of 5 to 30 minutes.

In another example of aspect 1, the active catalyst system is maintained at a temperature below 40° C. in the second in-line mixer.

In another example of aspect 1, the active catalyst system is mixed for less than 20 minutes prior to adding the aged active catalyst system to the polymerization vessel.

In another example of aspect 1, the polymerization of the conjugated diene monomer takes place within the polymerization vessel in a mixture containing less than 20 percent by weight of organic solvent based upon the total weight of the mixture in the polymerization vessel.

In another example of aspect 1, the polymerization of the conjugated diene monomer takes place within the polymerization vessel in a mixture that is substantially devoid of organic solvent.

In another example of aspect 1, the aged lanthanide component and the aged active catalyst system not being introduced into a tank prior to being added to the polymerization vessel.

In another example of aspect 1, the step of mixing the lanthanide catalyst component and the step of mixing the active catalyst system both being carried out in less than 30 minutes prior to the aged active catalyst system is added to the polymerization vessel.

In another example of aspect 1, the conjugated diene monomer is selected from the group consisting of 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene.

The first aspect may be provided alone or in combination with any one or more of the examples of the first aspect discussed above.

In a second aspect, there is a bulk polymerization process for preparing a polydiene. This process includes introducing conjugated diene monomer and an aged active catalyst system into a polymerization vessel to polymerize the conjugated diene monomer in a polymerization mixture, the polymerization mixture containing less than 20 weight percent of organic solvent based on the total weight of the polymerization mixture. The aged active catalyst system is formed by the process comprising combining a solution comprising an aluminoxane and an organoaluminum compound with a lanthanide compound and mixing the combination for less than 5 minutes by passing the combination through a first in-line mixer to form an aged lanthanide component, the aged lanthanide component being a homogeneous solution and mixing the aged lanthanide component with a halogen source for less than 30 minutes in a second in-line mixer to form the aged active catalyst system.

In an example of aspect 2, the first in-line mixer is a static mixer.

In another example of aspect 2, the second in-line mixer is a static mixer.

In another example of aspect 2, the total mixing time in the first in-line mixer and the second in-line mixer is less than 25 minutes.

In another example of aspect 2, the aged active catalyst system is a homogeneous solution.

In another example of aspect 2, the organoaluminum compound is not an aluminoxane compound.

The second aspect may be provided alone or in combination with any one or more of the examples of the first or second aspects discussed above.

DETAILED DESCRIPTION

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably not more than or less than 25. In an example, such a range defines independently at least 5, and separately and independently, not more than 25.

The present disclosure relates to a method for preparing catalysts to be used in an in-line bulk polymerization reaction. According to one or more embodiments, polydiene rubber is produced by the in-line bulk polymerization of conjugated diene monomer with an aged active catalyst system, which is formed through the following process: (a) introducing a solution containing an aluminoxane and an organoaluminum compound, the organoaluminum compound not being an aluminoxane, with a lanthanide compound to form a lanthanide catalyst component; (b) aging the lanthanide catalyst component to form an aged lanthanide catalyst component, the aging of the lanthanide catalyst component includes mixing; (c) combining the aged lanthanide catalyst component with a halogen source to form an active catalyst system; (d) aging the active catalyst system to form an aged active catalyst system, the aging of the active catalyst system includes mixing; and (e) adding the aged active catalyst system to a polymerization vessel to polymerize conjugated diene monomer. It has been found that this process leads to the formation of a homogenous catalyst, which is beneficial for use in an in-line bulk polymerization process because it decreases the likelihood of blockages, thereby decreasing the costs and time associated with production. The formation of the homogenous catalyst promotes the continuous mixing and flow of the catalyst in the catalyst feed system until the aged active catalyst system is fed to the reaction vessel.

The above-noted method for preparing a catalyst is carried out in an in-line system, which contains housings for catalytic elements (e.g., the aluminoxane component) connected by piping to mixers and the polymerization reaction vessel. For example, the aluminoxane and organoaluminum compound can be stored individually or together in one or more tanks for feeding the components to the in-line catalyst system. The lanthanide compound is housed in another tank that is fluidly connected to the aluminoxane and organoaluminum compound feeds. The halogen source is supplied from another housing or feed tank. In one embodiment, the housings and piping used in the in-line system are made of metal, such as stainless steel, or plastic, such as PVC or Teflon.

Valves and pumps can be used as known in the art to supply components from the housing to the mixing system, for example, a metering pump or syringe pump can be used to feed one or more catalyst components to the mixers. Valves can be positioned in the system to accommodate isolation of one or more components. For instance, a shut off valve can be placed at the outlet of each housing for feeding a catalyst component and at the upstream and downstream locations around each mixer to provide for access to systems operations and maintenance thereof. In another embodiment, catalyst component feed tanks can be pressurized to provide flow of the components through the system (e.g., through mixers) and into the reaction vessel. For example, an inert gas blanket (e.g., nitrogen) can be formed with compressed gas in each catalyst component feed tank.

As described further below, the in-line catalyst system contains one or more mixers, for example, two mixers for combining and mixing the catalyst components for forming a homogenous active catalyst system. The mixers also provide selective residence times for the mixing of the components. The residence mixing time functions to further age the active catalyst system prior to being fed to the reaction vessel.

In one embodiment, the mixers used in the in-line system are dynamic in-line mixers, which are installed directly into the process piping and achieve blending by agitating the components, for example, at high rates with blades or pistons. Dynamic mixers contain at least one moving part to provide mixing, for instance, rotating blades or discs that provide shear forces to the components. Dynamic mixers can include, but are not limited to, rotor-stator or rotor-rotor devices, homogenizers, pumps, and the like. The dynamic mixer can be driven by a motor. Rotor-stator mixers can include those supplied by IKA WORKS, Kady International, Charles Ross and Son Company, Silverson Machines, and rotor-rotor mixers can include those supplied by Pulsar.

In yet another embodiment, the mixers used in the in-line system are static in-line mixers. Static mixers can be installed directly in the process piping that feeds active catalyst to the reaction vessel. For example, static mixers positioned in feed piping can achieve blending as the catalytic elements flow through the mixer due, for example, to a loss of pressure or to increased turbulence. In one or more embodiments, the static mixer can be plate-type, in which plates, through which the elements must flow, are lodged in the piping. In another example, the static mixer can have a series of local constrictions (e.g., orifice, baffle, plate, perforated insert). The local constriction can be an insert that is removable from an outer housing, for example, a tube. In other embodiments, the static mixer can be helical-type, in which the elements must flow over or through baffles extending helically within the piping. The mixing components of the static mixer, for instance plates and baffles, may be made of any suitable material such as metal, such as stainless steel, or plastic, such as PVC or Teflon.

The dimensions of the mixers can be adjusted to result in a desired residence mixing time of the catalyst components. For example, the length and diameter of a static mixer can selected to control the residence and mixing time of the catalyst components in the mixer. A static mixer can have a diameter in the range of 0.6 to 15 cm, 1 to 10 cm, 1.5 cm to 5, or 2, 3 or 4 cm. For instance, an outer housing containing a mixing insert can have an inner diameter in the above ranges. The static mixer can have a length in the range of 0.1 to 6 m, 0.3 to 4 m, 0.5 to 3 m, or 1, 1.5, 2 or 2.5 m.

In another example, flow rate in the catalyst in-line system can be adjusted to control feed rate and residence time of active catalyst. A metering pump as known in the art can be used to provide a known feed rate to the reaction vessel and provide adequate pressure to pass the active catalyst through the in-line system.

In a first step of forming the active catalyst system, a solution containing an aluminoxane and an organoaluminum compound is introduced to or combined with a lanthanide compound to form a lanthanide catalyst component. The organoaluminum compound of the solution is preferably not an aluminoxane, for example, the solution can contain only one aluminoxane. In another embodiment, the solution can have more than one organoaluminum compound in combination with the aluminoxane, for example, the solution can contain 2, 3 or 4 organoaluminum compounds.

Aluminoxanes include oligomeric linear aluminoxanes that can be represented by the general formula:

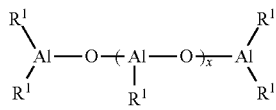

and oligomeric cyclic aluminoxanes that can be represented by the general formula:

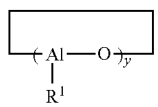

where x may be an integer of 1 to about 100, and in other embodiments about 10 to about 50; y may be an integer of 2 to about 100, and in other embodiments about 3 to 20; and where each $R^1$, which may be the same or different, may be a monovalent organic group that is attached to the aluminum atom by a carbon atom. In one or more embodiments, each $R^1$ is a hydrocarbyl group such as, but not limited to alkyl, cycloalkyl, substituted cycloalkyl, alkenyl, cycloalkenyl, substituted cycloalkenyl, aryl, aralkyl, alkaryl, allyl, and alkynyl groups. These hydrocarbyl groups may contain heteroatoms such as, but not limited to, nitrogen, oxygen, boron, silicon, sulfur, and phosphorus atoms. In one or more embodiments, the aluminoxanes may be soluble in a hydrocarbon solvent. The aluminoxane can be supplied and combined with the organoaluminum compound in a solvent or solvent system.

Preparation of aluminoxanes may be performed by reacting trihydrocarbyl aluminum compounds with water. Such reaction can be performed according to known methods, such as (1) a method in which the trihydrocarbylaluminum compound may be dissolved in an organic solvent and then contacted with water; (2) a method in which the trihydrocarbyl aluminum compound may be reacted with water of crystallization contained in, for example, metal salts, or water adsorbed in inorganic or organic compounds; and (3) a method in which the trihydrocarbylaluminum compound may be reacted with water in the presence of the monomer or monomer solution that is to be polymerized.

Aluminoxane compounds include, but are not limited to, methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, 2,6-dimethylphenylaluminoxane, and mixtures thereof. Modified methylaluminoxane can be formed by substituting about 20-80% of the methylgroups of methylaluminoxane with $C_2$ to $C_{12}$ hydrocarbyl groups, preferably with isobutyl groups, by using techniques known to those skilled in the art.

Assorted organoaluminum compounds or mixtures thereof can be used in the present disclosure. The term "organoaluminum compound," as it pertains to this disclosure, refers to any aluminum-containing compound possessing at least one aluminum-carbon bond that is not an aluminoxane. In one or more embodiments, organoaluminum compounds other than aluminoxanes include those represented by the formula $AlR_nX_{3-n}$, wherein each R, which may be the same or different, is a monovalent organic group attached to the aluminum atom through a carbon atom, wherein each X, which may be the same or different, is a carboxylate group, an alkoxide group, a hydrogen atom, or an aryloxide group, and where n is an integer of 1 to 3. In one or more embodiments, each R may be a hydrocarbyl group such as, but not limited to, alkyl, cycloalkyl, substituted cycloalkyl, alkenyl, cycloalkenyl, substituted cycloalkenyl, aryl, aralkyl, alkaryl, allyl, and alkynyl groups. These hydrocarbyl groups may also contain heteroatoms such as, but not limited to, nitrogen, oxygen, boron, silicon, sulfur, and phosphorus atoms.

In one or more embodiments, organoaluminum compounds other than aluminoxane include, but are not limited to, trihydrocarbylaluminum, dihydrocarbylaluminum hydride, hydrocarbylaluminum dihydride, hydrocarbylaluminum bis(carboxylate), dihydrocarbylaluminum carboxylate, hydrocarbylaluminum dialkoxide, dihydroaluminum dialkoxide, hydrocarbylaluminum diaryloxide, and dihydrocarbylaluminum aryloxide compounds.

Trihydrocarbylaluminum compounds include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Dihydrocarbylaluminum compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolyisopropylaluminym hydride, p-tolyl-n-butylaluminym hydride, p-tolylisobtylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Hydrocarbylaluminum dihydrides include ethylaluminum dihydride, n-propylaluminum dihydride, isopropyl aluminum dihydride, n-butylaluminum dihydride, isobutylaluminum dihydride, and n-octylaluminum dihydride.

Other organoaluminum compounds other than aluminoxane include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum ethoxide, diisobutylaluminum ethoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, similar compounds, and mixtures thereof.

The solution containing at least the aluminoxane and organoaluminum compounds is combined with at least one lanthanide compound to form a lanthanide catalyst system. For example, the lanthanide compound can be fed into transfer pipe containing the solution. In another example, the lanthanide compound can be fed into a supply or charge vessel containing the solution. Various lanthanide compounds or mixtures thereof can be utilized in the synthesis of this catalyst system and combined with the solution containing at least the aluminoxane and organoaluminum compounds. Lanthanide-containing compounds useful in the present disclosure are those compounds that include at least one atom of lanthanum, neodymium, cerium, praseodymium, promethium, dysprosium, holmium, erbium, thulium, ytterbium, lutetium, and didymium. Didymium may include a commercial mixture of rare-earth elements obtained from monazite sand.

The lanthanide atom in the lanthanide compound can be in various oxidation states including, but not limited to, the 0, +2, +3, and +4 oxidation states. Acceptable lanthanide-containing compounds include, but are not limited to, lanthanide carboxylates, lanthanide organophosphates, lanthanide organophosphonates, lanthanide organophosphinates, lanthanide carbates, lanthanide dithiocarbamates, lanthanide xanthates, lanthanide-β-diketones, lanthanide alkoxides or aryloxides, lanthanide pseudo-halides, and organolanthanide compounds.

In one or more embodiments, these compounds may be soluble in hydrocarbon solvents, such as aromatic hydrocarbons, aliphatic hydrocarbons, or cycloaliphatic hydrocarbons, and can be added to the solution in an organic solvent. In other embodiments, hydrocarbon-insoluble lanthanide compounds, which can be suspended in the polymerization medium to form the catalytically active species, are also useful. Pre-formed catalysts can include the combination of a small amount of conjugated diene monomer. For example, the lanthanide compound can be fed to the solution in the presence of an organic solvent, monomer or a combination thereof.

Without wishing to limit the practice of the present disclosure, further discussion will focus on neodymium compounds, although those skilled in the art will be able to select similar compounds that are based upon other lanthanide metals.

Neodymium carboxylates include neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (also known as neodymium versatate), neodymium naphthenate, neodymium stearate, neodymium oleate, neodymium benzoate, and neodymium picolinate.

Neodymium organophosphates include neodymium dibutylphosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl)phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl) phosphate, neodymium butyl(2-ethylhexyl) phosphate, neodymium (1-methylheptyl)(2-ethylhexyl)phosphate, and neodymium (2-ethylhexyl)(p-nonylphenyl)phosphate.

Neodymium organophosphonates include neodymium butyl phosphonate, neodymium pentyl phosphonate, neodymium hexyl phosphonate, neodymium heptylphosphonate, neodymium octyl phosphonate, neodymium (1-methylheptyl)phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl)phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl)(1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) p-nonylphenyl)phosphonate, neodymium butyl (2-ethylhexyl)phosphonate, neodymium (2-ethylhexyl)butylphosphonate, neodymium (1-methylheptyl) (2-ethylhexyl)phosphonate, neodymium (2-ethylhexyl) (1-methylheptyl) phosphonate, neodymium (2-ethylhexyl) (p-nonylphenyl) phosphonate, and neodymium (p-nonylphenyl) (2-ethylhexyl)phosphonate.

Neodymium organophosphinates include neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl)phosphinate, neodymiumbutyl (2-ethylhexyl)phosphinate, neodymium (1-methylheptyl) (2-ethylhexyl) phosphinate, and neodymium (2-ethylhexyl) (p-nonylphenyl)phosphinate.

Neodymium carbamates include neodymium dimethylcarbamate, neodymium diethylcarbamate, neodymium diisopropylcarbamate, deodymium dibutylcarbamate, and neodymium dibenzylcarbamate.

Neodymium dithiocarbamates include neodymium dimethyldithiocarbamate, neodymium diisopropyldithiocarbamate, neodymium dibutyldithiocarbamate, and neodymium dibenzyldithiocarbamate.

Neodymium xanthates include neodymium methylxanthate, neodymium ethylxanthate, neodymium isopropyl xanthate, neodymium butylxanthate, and neodymium benzylxanthate.

Neodymium β-diketonates include neodymium acetylacetonate, neyodymium trifluoroacetylacetonate, neodymium hexafuoroacetylacetonate, neodymium benzoylacetonate, and neodymium 2,2,6,6-tetramethyl-3,5-heptanedionate.

Neodymium alkoxides or aryloxides include neodymium methoxide, neodymium ethoxide, neodymium isopropoxide, neodymium 2-ethylhexoxide, neodymium phenoxide, neodymium nonylpheonxide, and neodymium napthoxide.

Acceptable neodymium pseudo-halides include neodymium cyanide, neodymium cyanate, neodymium thiocyanate, neodymium azide, and neodymium ferrocyanide.

The term organolanthanide compound may refer to any lanthanide compound containing at least one lanthanide-carbon bond. These compounds are predominantly, though not exclusively, those containing cyclopentadienyl (Cp), substituted cyclopentadienyl, allyl, and substituted allyl ligands. Suitable organolanthanide compounds include $Cp_3Ln$, $Cp_2LnR$, $Cp_2LnCl$, $CpLnCl_2$, CpLn (cyclooctatetraene), $(C_5Me_5)_2LnR$, $LnR_3$, $Ln(allyl)_3$, and $Ln(allyl)_2Cl$, where Ln represents a lanthanide atom, and R represents a hydrocarbyl group.

In a second step in forming the active catalyst system, the lanthanide catalyst component is aged to form an aged lanthanide catalyst component. The aging of the lanthanide catalyst component can include mixing, for example, the lanthanide catalyst component containing the aluminoxane and organoaluminum components can be passed through a mixer (e.g., a static mixer). The mixer can be a first in-line mixer. The mixer can continually mix the lanthanide catalyst component for a pre-determine time, for instance, the lanthanide catalyst component can have a residence time in the mixer or be circulated through the mixer in a recirculation loop for a set period of time. In one embodiment, the aging time (e.g., residence time in the first in-line mixer) may range from 30 seconds to 45 minutes, in other embodiments from 45 seconds to 30 minutes, and in other embodiments from 1 minute to 10 minutes, or 2, 3, 4, 5, 6, 7, 8 or 9 minutes.

To accomplish the desired residence time, the first in-line mixer can have a length and diameter as described above. In one embodiment, the first in-line mixer functions to mix and age the lanthanide catalyst component for less than 15, 10, 5, 4, 3 or 2 minutes. For example, the first in-line mixer can be a static mixer of sufficient length to continually mix the lanthanide catalyst component to form an aged lanthanide catalyst component.

The aged lanthanide catalyst component can be further mixed with a halogen source. Preferably, the aged lanthanide catalyst component is mixed until a homogenous solution is formed prior to a halogen source is added.

In a third step, the aged lanthanide catalyst component is combined with a halogen source to form an active catalyst system. For example, the halogen source can be introduced to the aged lanthanide catalyst component as it is discharged from the first in-line mixer. Prior to the aged lanthanide catalyst component being fed to the reaction vessel, the halogen source can be the only additional component added to the lanthanide catalyst.

Various halide-containing compounds or mixtures can be used as the halogen source in the synthesis of this catalyst system. Halide-containing compounds useful in the present disclosure are those that include at least one atom of fluorine, chlorine, bromine, iodine, and astatine. Without wishing to limit the practice of the present disclosure, further discussion will focus on bromine-containing compounds, although those skilled in the art will be able to select similar halide-containing compounds.

Advantageous bromine-containing compounds include elemental bromine, bromine-containing mixed halogens, and organic bromides. In one or more embodiments, the halogen source, for example, bromine-containing compounds, may be soluble in a hydrocarbon solvent and thus the halogen source may be combined with the aged lanthanide catalyst component as a solution or mixture with an organic solvent. Organic solvents can be hydrocarbon solvents, for example, hexane. In other embodiments, hydrocarbon-insoluble halogens (e.g., bromine-containing compounds) may be useful as they can be suspended in the polymerization medium to form the catalytically active species.

Bromine-containing mixed halogens include at least one bromine atom bonded to at least one other halogen atom that is not bromine. Suitable mixed halogens containing bromine include, for example, bromine monofluoride, bromine trifluoride, bromine pentafluoride, bromine monochloride, and iodine monobromide.

Organic bromides encompass compounds that include at least one bromine-carbon bond. In one or more embodiments, the organic bromides may be defined by the formula $R_{4-x}CBr_x$, where x is an integer from 1 to 4, and each R is independently a monovalent organic group, a halogen atom, or a hydrogen atom. In some embodiments, each R is independently a hydrogen atom or a hydrocarbyl group. Hydrocarbyl groups include, but are not limited to, alkyl, cycloalkyl, substituted cycloalkyl, alkenyl, cycloalkenyl, substituted cycloalkenyl, aryl, aralkyl, alkaryl, allyl, and alkynyl groups. These hydrocarbyl groups may contain heteroatoms such as, but not limited to, nitrogen, oxygen, boron, silicon, sulfur, and phosphorus atoms.

Types of organic bromides include, but are not limited to, brominated hydrocarbons, brominated carboxylic esters, and acyl bromides. Brominated hydrocarbons may include, but are not limited to, tetrabromomethane (also known as carbon tetrabromide), tribromomethane (also known as bromoform), bromomethane, dibromomethane, t-butyl bromide, 1-bromopropane, 2-bromopropane, 1,3-dibromopropane, 2,2-dimethyl-1-bromopropane (also known as neopentyl bromide), allyl bromide, benzyl bromide, diphenylmethyl bromide, triphenylmethyl bromide, bromobenzene, and benzylidene bromide (also known as α,α-dibromotoluene, or benzal bromide).

Types of brominated carboxylic esters include, but are not limited to, methyl bromoformate, methyl bromoacetate, methyl 2-bromopropionate, methyl 3-bromopropionate, methyl 2-bromobutyrate, methyl 2-bromohexanoate, methyl 4-bromocrotonate, methyl 2-bromobenzoate, methyl 3-bromobenzoate, and methyl 4-bromobenzoate.

Types of acyl bromides include, but are not limited to, formyl bromide, acetyl bromide, propionyl bromide, butyryl bromide, isobutyryl bromide, valeroyl bromide, isovaleryl bromide, hexanoyl bromide, and benzoyl bromide.

In a fourth step, the active catalyst system is aged to form an aged active catalyst system. To age the active catalyst system, the active catalyst system can be passed through a mixer (e.g., a static mixer), for example, a second in-line mixer. The mixer can continually mix the active catalyst system for a pre-determined period of time, for instance, the active catalyst system can have a residence time in the mixer or be circulated through the mixer in a recirculation loop for a set period of time. In one embodiment, the aging time (e.g., residence time in the second in-line mixer) may range from 2 minutes to 45 minutes, in other embodiments from 3 minutes to 30 minutes, and in other embodiments from 4 minutes to 25 minutes, or 5, 10, 15, 18 or 20 minutes.

To accomplish the desired residence time, the second in-line mixer can have a length and diameter as described above. In one embodiment, the second in-line mixer functions to mix and age the active catalyst system for less than 25, 20, 18, 15, 12 or 10 minutes. For example, the second in-line mixer can be a static mixer of sufficient length to continually mix the active catalyst system to form an aged active catalyst system, which can be further fed to the reaction vessel for carrying out polymerization reactions. For example, the aged active catalyst system can be fed directly to a reaction vessel as it is discharged from the second in-line mixer without out any other components being added to the catalyst system. The active catalyst system is preferably mixed until a homogenous aged active catalyst system is formed such that a homogenous solution is added to the reaction vessel.

In one or more embodiments, the catalyst components and/or catalyst systems are maintained at a temperature in the range of 20 to 50° C., and preferably below 40° C. or 30° C. Heat can be generated during combining and mixing the catalyst components. For example, mixing the active catalyst system can raise its temperature in this second in-line mixer. The mixers can be cooled to maintain the catalyst temperature below a desired temperature, which can avoid polymerization of components such as monomer that may be used to carry a particular catalyst component. The mixers can be cooled as known in the art, for instance, a cooling jacket can be positioned around the outer surface of the mixers.

In a fifth step of forming and using the aged active catalyst system, the aged active catalyst system can be added to a polymerization vessel to polymerize a conjugated diene monomer. The in-line process for preparing the aged active catalyst system provides a continuous catalyst-forming method that reduces production time, avoids formation and addition of heterogeneous catalysts and prevents long aging periods that can degrade a catalyst system, which leads to further production costs savings. The in-line process can provide a homogeneous aged active catalyst system that can be fed to a polymerization reaction vessel in less than 45, 30, 25, 20, 18 or 15 minutes from the time the lanthanide compound is added to the solution of an aluminoxane and organoaluninum compound. The in-line process is preferably arranged such that there is a continuous flow rate through the system to avoid stagnate portions of the system and accommodate a consistent and even velocity profile as the catalysts moves through the system and is fed into the reaction vessel.

In one or more embodiments, examples of conjugated diene monomer that can be polymerized according to the present disclosure include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexaidene. Mixtures of two or more conjugated dienes may also be utilized in copolymerization.

In other embodiments, the polymerization may be conducted in any conventional polymerization vessels known in the art. In one embodiment, bulk polymerization may be achieved in a conventional stirred-tank reactor, especially if the monomer conversion is less than about 60%. In other embodiments, such as when the monomer conversion in a bulk polymerization is higher than about 60%, which typically results in a highly viscous cement, the polymerization may be conducted in an elongated reactor in which the viscous cement under polymerization is driven to move by a piston, or substantially by a piston. For example, extruders in which cement is pushed along by a self-cleaning single-screw or double-screw agitator are suitable for this purpose. Examples of useful bulk polymerization processes are disclosed in U.S. Pat. No. 7,351,776 which is incorporated herein by reference. In one or more embodiments, all of the ingredients for polymerization can be combined within a single vessel and all polymerization steps can be conducted within the vessel.

In one or more embodiments, the heat of polymerization may be removed by external cooling through a thermally controlled reactor jacket, internal cooling by evaporation and condensation of the monomer through the use of a reflux condenser connected to the reactor, or a combination of the two methods. Also, the polymerization conditions may be controlled to conduct the polymerization under a pressure from about 0.1 atmosphere to about 50 atmospheres, in other embodiments from about 0.5 atmosphere to about 20 atmospheres, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

In yet other embodiments, compounds that will not undergo polymerization or incorporation into the resulting polymers will be suitable solvents for the catalyst system. In one or more embodiments, these compounds are liquid at ambient pressure and are inert to the catalyst. Hydrocarbons with a relatively low boiling point, such as hydrocarbons, aliphatic hydrocarbons, and cycloaliphatic hydrocarbons, are exemplary. Examples of aromatic hydrocarbons include, but are not limited to, benzene, toluene, xylenes, ethylbenzene, diethylbenzene, and mesitylene. Aliphatic hydrocarbons may include, but are not limited to, n-pentane, n-hexane, n-heptane, n-octane, n-nonane, n-decane, isopentane, isohexanes, isopentanes, isooctanes, 2,2-dimethylbutane, petroleum ether, kerosene and petroleum spirits. Examples of cycloaliphatic hydrocarbons include cyclopentane, cyclohexane, methylcyclopentane, and methylcyclohexane. Furthermore, mixtures of the above-noted hydrocarbons may be utilized. Hydrocarbons possessing low boiling points are typically separated from the polymer product after polymerization has finished.

Bulk polymerization, as described herein, is conducted within a system where the monomer acts as a solvent, and which generally refers to the fact that the system includes, for example, less than 50% by weight organic solvent based on the total weight of the monomer, polymer, and solvent within the bulk system. In other examples, the polymerization system includes less than 20%, 10%, 5%, or 2% by weight organic solvent based on the total weight of the monomer, polymer, and solvent within the system. In one embodiment, the bulk polymerization is carried out in the substantial absence of an organic solvent or diluent. In another embodiment, the bulk polymerization would be carried out in the absence of an organic solvent or diluent other than those solvents inherent to the raw elements employed.

To initiate polymerization, monomer and catalyst system are charged to the polymerization vessel. In one or more embodiments, bulk polymerization includes a continuous process wherein the catalyst system and the monomer are continuously fed into the vessel, and a portion of the reacted polymerization mixture is continuously removed. The reacted polymerization mixture may include unreacted polymer and catalyst system, as well as polymer product.

Bulk polymerization through the use of a catalyst system requires the use of an effective amount of catalyst to initiate and maintain an effective polymerization rate. The total amount of catalyst system to be used in polymerization depends on a variety of factors including, but not limited to, ingredient purity, temperature, reaction rate, and desired conversion. Thus, a specific concentration or amount of catalyst cannot be disclosed, but may be adjusted according to the state of what is known in the art. For example, the amount of catalyst system used can be varied from 0.01 to 2 mmol, 0.02 to 1 mmol, or 0.05 to 0.5 mmol per 100 g of conjugated diene monomer.

The bulk polymerization reaction may be carried out at low temperatures under anaerobic conditions, and at or below the vapor pressure of the monomer at the polymerization temperature. If an organic solvent is present, it may affect the vapor pressure at which the process is driven. Polymerization should be conducted at sufficiently high temperatures to ensure reasonable rates of polymer formation while also avoiding unreasonable reaction times, but not so high as to result in the production of excessively stringy or lumpy product due to excessively rapid polymerization rates. Customarily, the temperature of polymerization ranges from 0° C. to 120° C., with 20° C. to 95° C. being preferable for attaining both good catalyst reactivity and high polymer production rates. Temperature of polymerization may be regulated by cooling the exterior of the vessel through a cooling jacket, and thusly cooling the reaction chamber in the vessel, by removing monomer vapor to cool the reaction chamber, by recycling the monomer vapor in a condensed form at selective introduction points, or by using any combination of these methods.

The duration of polymerization reaction generally ranges from about 30 minutes to 60 minutes to several hours. Thus, the fresh monomer added to the polymerization vessel can remain in the reactor in the range of 30 minutes to 2 hours, and more preferably, 30 minutes to 90 minutes before departing the vessel as polymer.

In one or more embodiments, the polymers prepared according to this disclosure can be vulcanizable, for example, for the production of tires (e.g., vehicle tires). In one or more embodiments, the polymers can have a glass transition temperature ($T_g$) that is less than 0° C., less than −20° C., or less than −30° C. In one example, the polymers can exhibit a single glass transition temperature. In another example, the polymers may be hydrogenated or partially hydrogenated.

In one or more embodiments, the polymers of this disclosure may be cis-1,4-polydienes having a cis-1,4-linkage content that is greater than 97%, greater than 97.5%, greater than 98.0%, or greater than 98.5%, where the percentages are based upon the number of diene mer units adopting the cis-1,4-linkage versus the total number of diene mer units. The polymers can have a 1,2-linkage content that is less than about 1.0%, less than 0.8%, less than 0.7%, or less than 0.6%, where the percentages are based upon the number of diene mer units adopting the 1,2-linkage versus the total number of diene mer units. The balance of the diene mer units may adopt the trans-1,4-linkage.

The polymers produced by the polymerization reactions of this disclosure are particularly useful in preparing rubber compositions that can be used to manufacture tires and tire components. Rubber compounding techniques and the additives employed therein are generally disclosed in The Compounding and Vulcanization of Rubber, in Rubber Technology ($2^{nd}$ Ed. 1973).

In order to demonstrate the practice of the present disclosure, the following examples have been prepared and tested. These examples are provided solely for the purposes of illustration and should not be construed as limitations of the present disclosure. Numerous variations over these specific examples are possible without departing from the spirit and scope of the presently disclosed embodiments. More specifically, the particular temperature ranges, concentrations, and elements (e.g. Lanthanide compound, organoaluminum compounds, etc.) utilized in the examples should not be interpreted as limiting since other such elements consistent with the disclosure in the Detailed Description can be utilized in substitution. That is, the particular ingredients in the compositions, as well as their respective amounts and relative amounts, should be understood to apply to the more general content of the Detailed Description.

Example 1

The polymerization reactor consisted of a one-gallon stainless cylinder equipped with a mechanical agitator, possessing a shaft and blades, capable of mixing high viscosity polymer cement. The top of the reactor was connected to a reflux condenser system for conveying, condensing, and recycling the 1,3-butadiene vapor developed inside the reactor throughout the duration of the polymerization. The reactor was also equipped with a cooling jacket chilled by cold water. The heat of polymerization was dissipated partly by internal cooling through the use of the reflux condenser system, and partly by external cooling through heat transfer to the cooling jacket.

The reactor was thoroughly purged with a steam of dry nitrogen, which was then replaced with 1,3-butadiene vapor by charging 100 g of dry 1,3-butadiene monomer to the reactor, heating the reactor to 65° C., and then venting the 1,3-butadiene vapor from the top of the reflux condenser system until no liquid 1,3-butadiene monomer remained in the reactor. Cold water was applied to the reflux condenser and the reactor jacket, and 1302 g of 1,3-butadiene monomer and 3.9 ml of 0.4 M pyridine was charged into the reactor. After the monomer was thermostatted at 27° C., the polymerization reaction was initiated by charging into the reactor preformed catalyst, which had been prepared by mixing a combined solution containing 2.4 ml of 1.5 M methylaluminoxane in toluene, 0.39 ml of 2.0 M trimethylaluminum in hexane, and 1.90 ml of 1.0 M diisobutylaluminum hydride in hexane with a combined solution of 0.072 ml of 0.054 M neodymium versatate in hexane and 6.0 g of 21.5 wt % 1,3-butadiene in hexane. After aging for 2 minutes, 1.56 ml of 0.025 M tetrabromomethane in hexane was added and the solution was allowed to age for 15 minutes. No precipitation was observed during the formation of the catalyst. The methylaluminoxane solution contained a small amount of gel-like particles, however, treatment with trimethylaluminum and diisobutylaluminum hydride dissolved those particles and formed a homogeneous solution.

13.5 minutes after commencement, the polymerization was terminated by diluting the polymerization mixture with 6.0 ml isopropanol dissolved in 1360 g of hexane and dropping the batch into 11 L of isopropanol containing 5 g of 2,6-di-tert-butyl-4-methylphenol. The coagulated polymer was drum-dried. The yield of the polymer was 140.3 g (10.8% conversion). The Mooney viscosity ($ML_{1+4}$) of the polymer at 100° C. was determined to be 26.5 by using a Monsanto Mooney viscometer with a large rotor, a one-minute warm-up time, and a four-minute running time. As determined by gel permeation chromatography (GPC), the polymer had a number average molecular weight ($M_n$) of 128 kg/mol, a weight average molecular weight ($M_w$) of 242 kg/mol, and a molecular weight distribution ($M_w/M_n$) of 1.9. Infrared spectroscopic analysis of the polymer, determined by Fourier transform infrared spectroscopy (FTIR), indicated a cis-1,4-linkage content of 99.0%, a trans-1,4-linkage content of 0.8%, and a 1,2-linkage content of 0.2%.

Example 2

Comparative Example

The same procedure as used in Example 1 was employed, except that polymerization was initiated by charging into the reactor a preformed catalyst that had been prepared by mixing in the following order 6.0 g of 19.2 wt % 1,3-butadiene in hexane, 0.072 ml of 0.054 M neodymium versatate in hexane, 2.4 ml of 1.5 M methylaluminoxane in toluene, 0.39 ml of 2.0 M trimethylaluminum in hexane, and 1.90 ml of 1.0 M diisobutylaluminum hydride in hexane. After aging for two minutes, 1.56 ml of 0.025 M tetrabromomethane in hexane was added and the mixture was allowed to age for 15 minutes. Precipitation in the catalyst solution was evident upon the addition of methylaluminoxane to the butadiene in the hexane solution. Further precipitation occurred when the neodymium versatate in hexane solution was added to the methylaluminoxane and butadiene and hexane mixture. The solids remained present before finally dissolving after the addition of diisobutylaluminum hydride. Likewise, the methylaluminoxane also contained a small amount of gel-like particles before being added to the butadiene in hexane solution.

14.5 minutes after commencement, the polymerization was terminated by diluting the polymerization mixture with 6.0 ml isopropanol dissolved in 1360 g of hexane and dropping the batch into 11 L of isopropanol containing 5 g of 2,6-di-tert-butyl-4-methylphenol. The coagulated polymer was drum-dried. The yield of the polymer was 142.7 g (11.0% conversion). The Mooney viscosity ($ML_{1+4}$) of the polymer at 100° C. was determined to be 24.4 by using a Monsanto Mooney viscometer with a large rotor, a one-minute warm-up time, and a four-minute running time. As determined by gel permeation chromatography (GPC), the polymer had a number average molecular weight ($M_n$) of 121 kg/mol, a weight average molecular weight ($M_w$) of 257 kg/mol, and a molecular weight distribution ($M_w/M_n$) of 2.1. Infrared spectroscopic analysis of the polymer, determined by Fourier transform infrared spectroscopy (FTIR), indicated a cis-1,4-linkage content of 99.1%, a trans-1,4-linkage content of 0.7%, and a 1,2-linkage content of 0.2%.

A comparison of Example 1 and Comparative Example 2 evidences that combining the methylaluminoxane, trimethylaluminum, and diisobutylaluminum hydride before the addition of the neodymium versatate solution dissolved the gel-like particles in the methylaluminoxane and prevented the precipitation of solids during catalyst formation, which resulted in the homogenous catalyst solution. The homogeneous solution will not clause blockages and can be transferred with ease in piping.

All references, including but not limited to patents, patent applications, and non-patent literature are hereby incorporated by reference herein in their entirety.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

The invention claimed is:

1. A process for preparing a polydiene, the process comprising the steps of:
    a. introducing a solution comprising an aluminoxane and an organoaluminum compound, the organoaluminum compound not being an aluminoxane, with a lanthanide compound to form a lanthanide catalyst component;
    b. aging the lanthanide catalyst component to form an aged lanthanide catalyst component, the aging of the lanthanide catalyst component comprising mixing in a first in-line mixer;
    c. combining the aged lanthanide catalyst component with a halogen source to form an active catalyst system;
    d. aging the active catalyst system to form an aged active catalyst system, the aging of the active catalyst system comprising mixing in a second in-line mixer; and
    e. adding the aged active catalyst system to a polymerization vessel containing a conjugated diene monomer to polymerize the conjugated diene monomer in the polymerization vessel.

2. The process of claim 1, the first in-line mixer being a static mixer, wherein the static mixer comprises a local constriction.

3. The process of claim 1, the first in-line mixer being a dynamic mixer selected from the group consisting of a rotor-stator device, a rotor-rotor device, a homogenizer, and a pump.

4. The process of claim 1, the lanthanide catalyst component having a residence time in the first in-line mixer in the range of 1 to 10 minutes.

5. The process of claim 1, the lanthanide catalyst component being mixed for less than 5 minutes prior to combining the aged lanthanide catalyst component with the halogen source.

6. The process of claim 1, the aged lanthanide catalyst component being a homogeneous solution.

7. The process of claim 1, the second in-line mixer being a static mixer.

8. The process of claim 1, the second in-line mixer being a dynamic mixer.

9. The process of claim 1, the active catalyst system having a residence time in the second in-line mixer in the range of 5 to 30 minutes.

10. The process of claim 9, the active catalyst system being maintained at a temperature below 40° C. in the second in-line mixer.

11. The process of claim 1, the active catalyst system being mixed for less than 20 minutes prior to adding the aged active catalyst system to the polymerization vessel.

12. The process of claim 1, the polymerization of the conjugated diene monomer takes place within the polymerization vessel in a mixture containing less than 20 percent by weight of organic solvent based upon the total weight of the mixture in the polymerization vessel.

13. The process of claim 1, the polymerization of the conjugated diene monomer takes place within the polymerization vessel in a mixture that is substantially devoid of organic solvent.

14. The process of claim 1, the aged lanthanide component and the aged active catalyst system not being introduced into a tank prior to being added to the polymerization vessel.

15. The process of claim 1, the step of mixing the lanthanide catalyst component and the step of mixing the active catalyst system both being carried out in less than 30 minutes prior to the aged active catalyst system is added to the polymerization vessel.

* * * * *